United States Patent
Sato et al.

(10) Patent No.: US 9,803,044 B2
(45) Date of Patent: Oct. 31, 2017

(54) FLUORINE-CONTAINING OLIGOMER, NANO-SILICA COMPOSITE PARTICLES USING THE SAME, AND METHODS FOR PRODUCING BOTH

(71) Applicants: Unimatec Co., Ltd., Tokyo (JP); Hirosaki University, Aomori (JP)

(72) Inventors: Katsuyuki Sato, Ibaraki (JP); Hideo Sawada, Aomori (JP)

(73) Assignees: Unimatec Co., Ltd., Tokyo (JP); Hirosaki University, Aomori (JP)

( * ) Notice: Subject to any disclaimer, the term of this patent is extended or adjusted under 35 U.S.C. 154(b) by 0 days.

(21) Appl. No.: 14/773,160

(22) PCT Filed: Mar. 6, 2014

(86) PCT No.: PCT/JP2014/055817
§ 371 (c)(1),
(2) Date: Sep. 4, 2015

(87) PCT Pub. No.: WO2014/136892
PCT Pub. Date: Sep. 12, 2014

(65) Prior Publication Data
US 2016/0137768 A1 May 19, 2016

(30) Foreign Application Priority Data

Mar. 6, 2013 (JP) .................. 2013-044077
Mar. 6, 2013 (JP) .................. 2013-044079

(51) Int. Cl.
| | | |
|---|---|---|
| C08K 3/36 | (2006.01) |
| C08F 220/68 | (2006.01) |
| C08F 220/22 | (2006.01) |
| C08F 220/54 | (2006.01) |
| C08K 5/5419 | (2006.01) |
| C09C 1/30 | (2006.01) |

(52) U.S. Cl.
CPC .......... *C08F 220/68* (2013.01); *C08F 220/22* (2013.01); *C08F 220/54* (2013.01); *C08K 3/36* (2013.01); *C08K 5/5419* (2013.01); *C08K 2201/011* (2013.01); *C09C 1/309* (2013.01); *C09C 1/3072* (2013.01); *C09C 1/3081* (2013.01)

(58) Field of Classification Search
CPC ..... C09C 1/3072; C09C 1/3081; C09C 1/309; C08K 3/36
See application file for complete search history.

(56) References Cited

U.S. PATENT DOCUMENTS

| 5,726,247 A | 3/1998 | Michalczyk et al. |
| 5,863,679 A | 1/1999 | Tsushima et al. |
| 6,350,806 B1 | 2/2002 | Tsuda et al. |
| 2003/0077457 A1 | 4/2003 | Akamatsu et al. |
| 2006/0012656 A1 | 1/2006 | Suzuki et al. |
| 2008/0202384 A1 | 8/2008 | Peng et al. |
| 2009/0148653 A1* | 6/2009 | Brown .............. C08F 2/44 428/96 |
| 2009/0149096 A1 | 6/2009 | Brown et al. |
| 2011/0009555 A1 | 1/2011 | Kurihara et al. |
| 2011/0111659 A1 | 5/2011 | Brown et al. |
| 2011/0112233 A1 | 5/2011 | Brown et al. |

FOREIGN PATENT DOCUMENTS

| JP | 7-92695 | 4/1995 |
| JP | 11-124534 | 5/1999 |
| JP | 2000-500161 A | 1/2000 |
| JP | 2003-64309 A | 3/2003 |
| JP | 2006-44226 A | 2/2006 |
| JP | 2010-138156 | 6/2010 |
| JP | 2010-521541 A | 6/2010 |
| JP | 2010-209280 | 9/2010 |
| JP | 2011-026153 | 2/2011 |
| JP | 2011/506640 A | 3/2011 |
| JP | 2011-190291 | 9/2011 |
| KR | 10-2009-0051068 A | 5/2009 |
| WO | WO 2008/021153 A2 | 2/2008 |

(Continued)

OTHER PUBLICATIONS

International Patentability Report and Written Opinion from corresponding PCT application No. PCT/JP2014/055817 dated 0009/17/2015 (7 pgs).

(Continued)

*Primary Examiner* — Margaret Moore
(74) *Attorney, Agent, or Firm* — Brinks Gilson & Lione

(57) ABSTRACT

Disclosed is a fluorine-containing oligomer comprising a copolymer of a fluoroalkyl alcohol (meth)acrylic acid derivative represented by the general formula:

$$C_nF_{2n+1}(CH_2CF_2)_a(CF_2CF_2)_b(CH_2CH_2)_c$$
$$OCOCR=CH_2 \quad [I]$$

wherein R is a hydrogen atom or a methyl group, n is an integer of 1 to 6, a is an integer of 1 to 4; b is an integer of 0 to 3; and c is an integer of 1 to 3; and a (meth)acrylic acid derivative represented by the general formula:

$$(CH_2=CRCO)_mR' \quad [II]$$

wherein R is a hydrogen atom or a methyl group, m is 1, 2, or 3; and when m is 1, R' is OH group, $NH_2$ group that is unsubstituted or mono- or di-substituted with an alkyl group having 1 to 6 carbon atoms, or a monovalent group derived from an alkylene glycol or polyalkylene glycol group containing an alkylene group having 2 or 3 carbon atoms; when m is 2 or 3, R' is a divalent or trivalent organic group derived from a diol or triol. The copolymerization reaction is performed using a hydrocarbon-based peroxide or azo compound polymerization initiator. Also disclosed are nano-silica composite particles formed as a condensate of the fluorine-containing oligomer and an alkoxysilane with nano-silica particles.

4 Claims, No Drawings

(56) References Cited

FOREIGN PATENT DOCUMENTS

WO  WO 2009/034773 A1  3/2009
WO  WO 2011/056525 A1  5/2011

OTHER PUBLICATIONS

International Search Report from corresponding PCT application No. PCT/JP2014/055817 dated Jun. 10, 2014 (4 pgs).

\* cited by examiner

FLUORINE-CONTAINING OLIGOMER, NANO-SILICA COMPOSITE PARTICLES USING THE SAME, AND METHODS FOR PRODUCING BOTH

RELATED APPLICATION

This application is a 35 U.S.C. §371 national phase filing of International Patent Application No. PCT/JP2014/055817, filed Mar. 6, 2014, which claims priority under 35 U.S.C. §119 to Japanese Patent Application Nos. 2013-044077, filed Mar. 6, 2013 and 2013-044079, filed Mar. 6, 2013, the entire disclosure of each of which is hereby expressly incorporated by reference.

TECHNICAL FIELD

The present invention relates to a fluorine-containing oligomer, nano-silica composite particles using the same, and methods for producing both. More particularly, the present invention relates to a fluorine-containing oligomer obtained by a copolymerization reaction without using a fluorine-based peroxide initiator, and relates to nano-silica composite particles using the same, and methods for producing both.

BACKGROUND ART

Patent Document 1 discloses a nano-substance containing a fluorine-containing compound represented, for example, by the general formula:

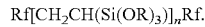

Rf[CH$_2$CH(Si(OR)$_3$)]$_n$Rf.

Patent Document 1 also discloses a nano-composite obtained by further incorporating a specific silane coupling agent into the nano-substance. Patent Document 1 indicates that the fluorine-containing compound is produced by a method comprising reacting a corresponding olefin monomer in the presence of an organic peroxide having an Rf group (perfluoroalkyl group).

Moreover, Patent Document 2 discloses a method for obtaining polyaniline-containing nano-composite particles by oxidizing aniline in the presence of a fluoroalkyl group-containing oligomer represented by the general formula:

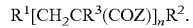

R$^1$[CH$_2$CR$^3$(COZ)]$_n$R$^2$.

Patent Document 2 indicates that the fluoroalkyl group-containing oligomer is obtained by reacting a fluoroalkanoyl peroxide compound and an acrylic acid, etc.

However, perfluoroalkanoyl peroxides used in these methods are very unstable, and have the risk of decomposition or explosion; therefore, special safety measures are required. Patent Document 3 also indicates that a method using a fluorine-based peroxide is not suitable for mass production. Further, since the fluorine-containing functional groups of the fluorine-containing oligomer become bound only to both ends of the oligomer as groups derived from the perfluoroalkanoyl peroxide, which is a polymerization initiator, there are problems that it is difficult to control the fluorine group content, and that the oil-repellent performance derived from fluorine is less likely to be exhibited.

Patent Document 3 discloses fluorine-containing silica composite particles comprising a mixture of silica nanoparticles, a fluorine-containing surfactant represented by the general formula:

QOSO$_2$RfT, and a hydrolysate mixture of a functional alkoxysilane or a dehydration condensate thereof, without using a fluorine-based peroxide. Patent Document 3 indicates that the silica composite particles serve as a material that utilizes the chemical and thermal stability of silica, and the excellent water- and oil-repellency, antifouling properties, and catalytic characteristics of the fluorine compound.

However, the fluorine compound used in Patent Document 3 is a surfactant containing a sulfone group SO$_2$, and is produced by electrolytic fluorination method. In the electrolytic fluorination method, a large amount of anhydrous hydrogen fluoride is used in the reaction, which thus requires sufficient safety measures. Other problems are that this method is not suitable for mass production in terms of the characteristics of the reaction, and that the resulting fluorine compounds are very expensive.

PRIOR ART DOCUMENTS

Patent Documents

Patent Document 1: JP-A-2010-138156
Patent Document 2: JP-A-2011-190291
Patent Document 3: JP-A-2010-209280
Patent Document 4: WO 2009/034773 A1

OUTLINE OF THE INVENTION

Problem to be Solved by the Invention

An object of the present invention is to provide a fluorine-containing oligomer obtained by a copolymerization reaction without using a fluorine-based peroxide initiator, and to provide nano-silica composite particles using the same, and methods for producing both.

Means for Solving the Problem

The present invention provides a fluorine-containing oligomer comprising a copolymer of a fluoroalkyl alcohol (meth)acrylic acid derivative represented by the general formula:

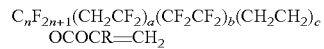

C$_n$F$_{2n+1}$(CH$_2$CF$_2$)$_a$(CF$_2$CF$_2$)$_b$(CH$_2$CH$_2$)$_c$OCOCR═CH$_2$    [I]

wherein R is a hydrogen atom or a methyl group, n is an integer of 1 to 6, a is an integer of 1 to 4; b is an integer of 0 to 3; and c is an integer of 1 to 3; and a (meth)acrylic acid derivative represented by the general formula:

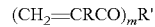

(CH$_2$═CRCO)$_m$R'    [II]

wherein R is a hydrogen atom or a methyl group, m is 1, 2, or 3; and when m is 1, R' is an OH group, an NH$_2$ group that is unsubstituted or mono- or di-substituted with an alkyl group having 1 to 6 carbon atoms, or a monovalent group derived from an alkylene glycol or polyalkylene glycol group containing an alkylene group having 2 or 3 carbon atoms; when m is 2 or 3, R' is a divalent or trivalent organic group derived from a diol or triol.

The fluorine-containing oligomer is produced by copolymerizing the above fluoroalkyl alcohol (meth)acrylic acid derivative [I] and (meth)acrylic acid derivative [II] in the presence of a hydrocarbon-based organic peroxide or azo compound polymerization initiator.

The term (meth)acrylic acid used herein refers to acrylic acid or methacrylic acid.

Further, the present invention provides nano-silica composite particles formed as a condensate of the above fluorine-containing oligomer and an alkoxysilane with nano-silica particles.

The nano-silica composite particles are produced by reacting the above fluorine-containing oligomer and an alkoxysilane in the presence of nano-silica particles using an alkaline or acidic catalyst.

Effect of the Invention

The fluorine-containing oligomer according to the present invention can be produced without using a fluorine-based peroxide initiator, and can be effectively used in the production of nano-silica composite particles, etc. Moreover, the use of a fluorine-containing monomer having a polymerizable functional group as a monomer has the advantage of easily controlling the fluorine content of the fluorine-containing oligomer and the fluorine content of the nano-silica composite particles.

Furthermore, fluorine-containing nano-silica composite particles produced by using the fluorine-containing oligomer have effects in not only that the average particle diameter and its variation range are small, but also that the particles are excellent in terms of heat-resistant weight loss.

EMBODIMENTS FOR CARRYING OUT THE INVENTION

The fluorine-containing oligomer is produced by copolymerizing a fluoroalkyl alcohol (meth)acrylic acid derivative represented by the general formula:

$$C_nF_{2n+1}(CH_2CF_2)_a(CF_2CF_2)_b(CH_2CH_2)_c OCOCR=CH_2 \quad [I]$$

R: H or a methyl group
n: 1 to 6, preferably 2 to 4
a: 1 to 4, preferably 1,
b: 0 to 3, preferably 1 to 2,
c: 1 to 3, preferably 1,
and a (meth)acrylic acid derivative represented by the general formula:

$$(CH_2=CRCO)_mR' \quad [II]$$

R: H or a methyl group
m: 1, 2, or 3
R': when m is 1, OH group, an ammonium group that is unsubstituted or substituted with an alkyl, or a monovalent group derived from an alkylene glycol or polyalkylene glycol group containing an alkylene group having 2 or 3 carbon atoms; when m is 2 or 3, a divalent or trivalent organic group derived from a diol or a triol,
in the presence of a hydrocarbon-based peroxide or azo compound polymerization initiator.

The fluoroalkyl alcohol (meth)acrylic acid derivative [I] is described in Patent Document 4, and is synthesized through the following series of steps.

First, a fluoroalkyl iodide represented by the general formula:

$$C_nF_{2+1}(CH_2CF_2)_a(CF_2CF_2)_b(CH_2CH_2)_cI$$

is reacted with N-methylformamide $HCONH(CH_3)$ to form a mixture of fluoroalkyl alcohol and its formate. Then, the mixture is hydrolyzed in the presence of an acid catalyst, thereby forming a fluoroalkyl alcohol of the formula:

$$C_nF_{2n+1}(CH_2CF_2)_a(CF_2CF_2)_b(CH_2CH_2)_cOH.$$

The obtained fluoroalkyl alcohol is esterified with acrylic acid or methacrylic acid to obtain a fluoroalkyl alcohol (meth)acrylic acid derivative.

Examples of the above fluoroalkyl iodide include the following:

$$CF_3(CH_2CF_2)(CH_2CH_2)I$$

$$C_2F_5(CH_2CF_2)(CH_2CH_2)I$$

$$C_2F_5(CH_2CF_2)(CH_2CH_2)_2I$$

$$C_3F_7(CH_2CF_2)(CH_2CH_2)I$$

$$C_3F_7(CH_2CF_2)(CH_2CH_2)_2I$$

$$C_4F_9(CH_2CF_2)(CH_2CH_2)I$$

$$C_4F_9(CH_2CF_2)(CH_2CH_2)_2I$$

$$C_2F_5(CH_2CF_2)(CF_2CF_2)(CH_2CH_2)I$$

$$C_2F_5(CH_2CF_2)(CF_2CF_2)(CH_2CH_2)_2I$$

$$C_2F_5(CH_2CF_2)_2(CF_2CF_2)(CH_2CH_2)I$$

$$C_2F_5(CH_2CF_2)_2(CF_2CF_2)(CH_2CH_2)_2I$$

$$C_4F_9(CH_2CF_2)(CF_2CF_2)(CH_2CH_2)I$$

$$C_4F_9(CH_2CF_2)_2(CF_2CF_2)(CH_2CH_2)I$$

$$C_4F_9(CH_2CF_2)(CF_2CF_2)(CH_2CH_2)_2I$$

$$C_4F_9(CH_2CF_2)_2(CF_2CF_2)_2(CH_2CH_2)_2I$$

The (meth)acrylic acid derivative of the formula: $(CH_2=CRCO)_mR'$ [II], which is to be copolymerized with the fluoroalkyl alcohol (meth)acrylic acid derivative [I], is, when m is 1, a compound represented by the general formula:

$$CH_2=CRCOOH$$

$$CH_2=CRCONR^1R^2$$

$R^1$, $R^2$: H or an alkyl group having 1 to 6 carbon atoms $$CH_2=CRCOR^3$$

$R^3$: a monovalent group derived from an alkylene glycol or polyalkylene glycol group containing an alkylene group having 2 or 3 carbon atoms.

When m is 2 or 3, R' is a divalent organic group derived from a diol, such as the abovementioned alkylene glycol or polyalkylene glycol group, or a trivalent organic group derived from a triol, such as trimethylolpropane.

The copolymerization reaction of both derivatives is performed by a solution-polymerization method in an organic solvent, such as methanol, ethanol, isopropanol, acetone, methyl ethyl ketone, tetrahydrofuran, ethyl acetate, chloroform, 1,2-dichloroethane, or AK-225, which is described later, in the presence of a hydrocarbon-based peroxide or azo compound polymerization initiator, such as tertiary-butyl peroxide, diisopropylbenzene hydroperoxide, cumene hydroperoxide, 2,2'-azobis(2,4-dimethylvaleronitrile), or azobis(isobutyronitrile). Such a polymerization initiator is used at a ratio of about 0.1 to 50 wt. %, preferably about 5 to 20 wt. %, based on the weight of the monomer mixture.

The amount of copolymerized fluorine-containing monomer [I] in the obtained fluorine-containing oligomer is about 0.1 to 50 mol %, preferably about 1 to 20 mol %. The oligomer has a number average molecular weight Mn of about 5,000 or less, preferably about 100 to 3,000, and has a particle diameter of 200 nm or less. The dispersibility of fluorine-containing oligomer white powder when dispersed in various solvents is also excellent, except in hydrocarbon solvents.

The thus-obtained fluorine-containing oligomer is reacted with an alkoxysilane in the presence of nano-silica particles using an alkaline or acidic catalyst, thereby forming nano-silica composite particles.

As the nano-silica particles, organosilica sol having an average particle diameter (measured by a dynamic light scattering method) of 5 to 200 nm, preferably 10 to 100 nm, and having a primary particle diameter of 40 nm or less, preferably 5 to 30 nm, even more preferably 10 to 20 nm, is used. Practically used are commercial products of Nissan Chemical Industries, Ltd., such as Methanol Silica Sol, Snowtex IPA-ST (isopropyl alcohol dispersion), Snowtex EG-ST (ethylene glycol dispersion), Snowtex MEK-ST (methyl ethyl ketone dispersion), and Snowtex MIBK-ST (methyl isobutyl ketone dispersion).

Examples of the alkoxysilane include alkoxysilanes represented by the general formula:

$$(R_1O)_pSi(OR_2)_q(R_3)_r \qquad [III]$$

$R_1$, $R_3$: H, $C_1$-$C_6$ alkyl group, or an aryl group
$R_2$: $C_1$-$C_6$ alkyl group or an aryl group,
proviso that not all of $R_1$, $R_2$, and $R_3$ are aryl groups
p+q+r: 4, proviso that q is not 0.

Specific examples thereof include trimethoxysilane, triethoxysilane, trimethoxymethylsilane, triethoxymethylsilane, trimethoxyphenylsilane, triethoxyphenylsilane, tetramethoxysilane, tetraethoxysilane, and the like.

The proportion of these components are such that about 10 to 100 parts by weight, preferably about 20 to 80 parts by weight, of fluorine-containing oligomer, and about 0.1 to 100 parts by weight, preferably about 20 to 80 parts by weight, of alkoxysilane are used based on 100 parts by weight of nano-silica particles. When the amount of fluorine-containing oligomer used is less than this range, the water- and oil-repellency decreases. In contrast, when the amount of fluorine-containing oligomer used is greater than this range, dispersibility in solvents decreases.

The reaction between these components is performed in the presence of a catalytic amount of an alkaline or acidic catalyst, such as aqueous ammonia, an aqueous solution of a hydroxide of an alkali metal or alkaline earth metal (e.g., sodium hydroxide, potassium hydroxide, or calcium hydroxide), or hydrochloric acid, or sulfuric acid, at a temperature of about 0 to 100° C., preferably about 10 to 50° C., for about 0.5 to 48 hours, preferably about 1 to 10 hours.

In the nano-silica composite particles obtained from the reaction, it is considered that the fluorine-containing oligomer becomes bound to a hydroxyl group present on the surface of the nano-silica particles via a siloxane bond, or that the fluorine-containing oligomer is included in a shell having a siloxane skeleton. Therefore, the chemical and thermal stability of silica, and the excellent water- and oil-repellency, antifouling properties, etc., of the fluorine-containing oligomer are effectively exhibited. In fact, the nano-silica composite particles have the effect of reducing weight loss at 800° C. Moreover, the particle size of the nano-silica composite particles and the variation of the particle size also show small values. The nano-silica composite particles are thus formed by a condensation reaction of a fluorine-containing oligomer and a silane derivative with nano-silica particles; however, mixing of other components is allowed, as long as the object of the present invention is not impaired.

EXAMPLES

The following describes the present invention with reference to Examples.

Reference Example 1

In 50 ml of isopropanol, $$CF_3(CF_2)_3(CH_2)_2OCOCH{=}CH_2 \qquad [FAAC\text{-}4]$$

3.00 g $$CH_2{=}CHCON(CH_3)_2 \qquad [DMAA]$$

27.37 g were charged. While stirring the isopropanol solution of them, an initiator, i.e., 2,2'-azobis(2,4-dimethylvaleronitrile)

3.04 g (V-65, a product of Wako Pure Chemical Industries, Ltd.) was added. After nitrogen was bubbled to replace the dissolved oxygen, the mixture was heated until the inner temperature reached 50° C. While maintaining this temperature, the mixture was reacted for 5 hours.

The reaction mixture was supplied in n-hexane, and the generated fluorine-containing oligomer was separated by filtration, thereby obtaining 30 g (yield: 90.0%) of white powder fluorine-containing oligomer. When the molecular weight of the fluorine-containing oligomer was measured by GPC, the number average molecular weight Mn was 801, and Mn/Mw, which indicates molecular weight distribution, was 1.74. Further, when the copolymerization ratio of the obtained fluorine-containing oligomer was measured by $^1$H-NMR, FAAC-4:DMAA was 2:98 (mol %).

Examples 1 to 6 and Reference Examples 2 to 6

In Reference Example 1, the types and amounts (unit: g) of the fluorine-containing monomer [I] and its comonomer [II], and the amount (unit: g) of the polymerization initiator (V-65) were changed in various ways. The results shown in Table 1 (Examples) and Table 2 (Reference Examples) below were obtained. Then, Table 2 also shows the results of Reference Example 1. The Mn of fluorine-containing oligomers in which PDE 100 is copolymerized cannot be measured because they are insoluble in the GPS mobile phase.

(Fluorine-Containing Monomers)

$$CF_3(CF_2)_3CH_2(CF_2)_5(CH_2)_2OCOCH{=}CH_2$$

$$C_4F_9(CH_2CF_2)(CF_2CF_2)_2(CH_2CH_2)OCOCH{=}CH_2 \qquad DTFAC:$$

$$CF_3(CF_2)_3CH_2(CF_2)_5(CH_2)_2OCOC(CH_3){=}CH_2$$

$$C_4F_9(CH_2CF_2)(CF_2CF_2)_2(CH_2CH_2)OCOC(CH_3){=}CH_2 \qquad DTFMAC:$$

$$CF_3(CF_2)_5(CH_2)_2OCOCH{=}CH_2 \qquad FAAC\text{-}6:$$

$$CF_3(CF_2)_7(CH_2)_2OCOCH{=}CH_2 \qquad FAAC\text{-}8:$$

(Comonomers)
PDE 100: Diethylene glycol dimethacrylate
ACA: Acrylic acid

Tables 1 and 2 also show the particle diameter (unit: nm) of the produced fluorine-containing oligomer white powders measured by a dynamic light scattering method, the particle diameter distribution, and the dispersibility of the powders. The dispersibility was visually observed when 1 wt. % of each powder was dispersed in various solvents, and evaluated according to the following evaluation criteria. Regarding the solvent dispersibility, dispersibility in water, methanol, ethanol, isopropanol, and dimethylsulfoxide is ○, while dispersibility in toluene and n-hexane is X; therefore, their descriptions are omitted.

○: Uniformly dispersed, and transparent dispersion
Δ: Slightly dispersed, and cloudy dispersion
X: Not dispersed, but precipitated in dispersion medium

TABLE 1

| Example | 1 | 2 | 3 | 4 | 5 | 6 |
|---|---|---|---|---|---|---|
| [Monomer, initiator] | | | | | | |
| Fluorine-containing monomer | | | | | | |
| DTFAC | 3.10 | 3.02 | 3.31 | — | 3.27 | — |
| DTFMAC | — | — | — | 3.21 | — | 3.04 |
| Comonomer | | | | | | |
| DMAA | 27.22 | 27.14 | — | — | — | — |
| PDE 100 | — | 5.04 | — | — | 5.21 | 5.04 |
| ACA | — | — | 27.45 | 27.09 | 27.06 | 27.04 |
| Polymerization initiator | | | | | | |
| V-65 | 3.07 | 3.06 | 3.02 | 3.01 | 3.06 | 3.04 |
| [F-containing oligomer] | | | | | | |
| Yield (%) | 99.3 | 107.5 | 112.7 | 93.8 | 105.8 | 95.2 |
| Mn | 2107 | — | 1142 | 667 | — | — |
| Mn/Mw | 1.09 | — | 1.00 | 1.82 | — | — |
| Copolymerization ratio (mol %) | | | | | | |
| Fluorine-containing monomer | 7 | 3 | 1 | 16 | 1 | 4 |
| DMAA | 93 | 93 | — | — | — | — |
| PDE100 | — | 4 | — | — | 5 | 2 |
| ACA | — | — | 99 | 84 | 94 | 94 |
| Particle diameter | | | | | | |
| Average value | 35.4 | 41.1 | 41.8 | 126 | 54.6 | 33.0 |
| Average value± | 8.0 | 11.7 | 3.8 | 13.1 | 12.4 | 9.7 |
| Solvent dispersibility | | | | | | |
| Acetone | ○ | ○ | Δ | Δ | ○ | Δ |
| Tetrahydrofuran | ○ | ○ | ○ | ○ | ○ | ○ |
| Ethyl acetate | ○ | ○ | Δ | Δ | X | Δ |
| Chloroform | ○ | ○ | Δ | Δ | X | Δ |
| ClCH$_2$CH$_2$Cl | ○ | ○ | Δ | Δ | X | Δ |
| AK-225 | ○ | ○ | Δ | Δ | X | Δ |

TABLE 2

| Reference Example | 1 | 2 | 3 | 4 | 5 | 6 |
|---|---|---|---|---|---|---|
| [Monomer, initiator] | | | | | | |
| Fluorine-containing monomer | | | | | | |
| FAAC-4 | 3.00 | — | — | — | — | — |
| FAAC-6 | — | 3.02 | — | 3.05 | — | — |
| FAAC-8 | — | — | 3.08 | — | 3.07 | 3.17 |
| Comonomer | | | | | | |
| DMAA | 27.37 | 27.07 | 27.01 | 27.05 | — | — |
| PDE 100 | — | — | — | 5.0 | — | 5.07 |
| ACA | — | — | — | — | 27.12 | 27.04 |
| Polymerization initiator | | | | | | |
| V-65 | 3.04 | 3.11 | 3.27 | 3.00 | 3.33 | 3.20 |
| [F-containing oligomer] | | | | | | |
| Yield (%) | 90.0 | 87.3 | 77.8 | 71.0 | 106.5 | 97.1 |
| Mn | 801 | 2078 | 2202 | — | 1032 | — |
| Mn/Mw | 1.74 | 1.01 | 1.03 | — | 1.02 | — |
| Copolymerization ratio (mol %) | | | | | | |
| Fluorine-containing monomer | 2 | 13 | 6 | 3 | 3 | 5 |
| DMAA | 98 | 87 | 94 | 93 | — | — |
| PDE100 | — | — | — | 4 | — | 12 |
| ACA | — | — | — | — | 97 | 83 |
| Particle diameter | | | | | | |
| Average value | 64.5 | 87.0 | 106 | 17.2 | 41.9 | 76.7 |
| Average value± | 9.8 | 11.4 | 17.6 | 2.4 | 4.2 | 9.8 |
| Solvent dispersibility | | | | | | |
| Acetone | ○ | ○ | ○ | ○ | Δ | ○ |
| Tetrahydrofuran | ○ | ○ | ○ | ○ | ○ | ○ |
| Ethyl acetate | ○ | ○ | ○ | ○ | X | Δ |
| Chloroform | ○ | ○ | ○ | ○ | X | X |
| ClCH$_2$CH$_2$Cl | ○ | ○ | ○ | ○ | Δ | X |
| AK-225 | ○ | Δ | ○ | ○ | X | Δ |

Note 1
AK-225: a product of AGC; an amount mixture of 1,1-dichloro-2,2,3,3,3-pentafluoropropane and 1,3-dichloro-1,2,2,3,3-pentafluoropropane Note 2
Fluorine-containing oligomers with a yield of 100% or more are considered to contain the solvent Reference Example 11

To 0.25 g of the fluorine-containing oligomer (FAAC-8-DMAA copolymer) obtained in Reference Example 3, 1.67 g (0.50 g as nano-silica) of silica sol (Methanol Silica Sol, a product of Nissan Chemical Industries, Ltd.; nano-silica content: 30 wt. %, average particle diameter: 11 nm) and 20 ml of methanol were added. Further, 0.25 ml of tetraethoxysilane (a product of Tokyo Chemical Industry Co., Ltd.; density: 0.93 g/ml) and 0.25 ml of 25 wt. % aqueous ammonium were added under stirring conditions, and the mixture was reacted for 5 hours.

The methanol and aqueous ammonium were removed from the reaction mixture, which was a white solution, using an evaporator, and the taken white powder was redispersed in 10 ml of methanol overnight. After centrifugation, the resultant was rinsed with methanol, and the obtained powder was dried in an oven at 70° C., and then vacuum dried at 50° C. As a result, 0.507 g (yield: 62%) of white powder, which was nano-silica composite particles, was obtained.

The particle diameter of the obtained white powder was measured by a dynamic light scattering (DLS) method in a state where 1 g of white powder was dispersed in 1 L of methanol. In addition, the weight loss of the powder was measured in the following manner. That is, the rate of weight loss (percentage of reduced weight to initial weight) when the powder was heated to 800° C. at a heating rate of 10° C./min was measured using TGA (TG-DTA2000SA, produced by Bruker AXS).

Reference Example 12

In Reference Example 11, the same amount (0.25 g) of the fluorine-containing oligomer (FAAC-8-ACA copolymer oligomer) obtained in Reference Example 5 was used as the fluorine-containing oligomer.

Example 11

In Reference Example 11, the same amount (0.25 g) of the fluorine-containing oligomer (DTFAC-DMAA copolymer oligomer) obtained in Example 1 was used as the fluorine-containing oligomer.

Example 12

In Reference Example 11, the same amount (0.25 g) of the fluorine-containing oligomer (DTFAC-ACA copolymer oligomer) obtained in Example 3 was used as the fluorine-containing oligomer.

Example 13

In Reference Example 11, the same amount (0.25 g) of the fluorine-containing oligomer (DTFMAC-ACA copolymer oligomer) obtained in Example 4 was used as the fluorine-containing oligomer.

Table 3 below shows the measurement results obtained in Reference Examples 11 and 12, and Examples 11 to 13, together with the generation amount and yield of nano-silica composite particles.

TABLE 3

| | Nano-silica composite particles | | | |
|---|---|---|---|---|
| Example | Generation amount (g) | Yield (%) | Particle diameter (nm) | Weight loss (%) |
| Ref. Ex. 11 | 0.507 | 62 | 49.6 ± 12.4 | 19 |
| Ref. Ex. 12 | 0.572 | 70 | 45.3 ± 10.4 | 8 |

TABLE 3-continued

| | Nano-silica composite particles | | | |
|---|---|---|---|---|
| Example | Generation amount (g) | Yield (%) | Particle diameter (nm) | Weight loss (%) |
| Ex. 11 | 0.646 | 79 | 51.9 ± 14.4 | 10 |
| Ex. 12 | 0.507 | 62 | 30.9 ± 6.4 | 20 |
| Ex. 13 | 0.580 | 71 | 41.2 ± 18.0 | 13 |

The invention claimed is:

1. Nano-silica composite particles formed as a condensate of a fluorine-containing oligomer and an alkoxysilane with nano-silica particles, wherein the fluorine-containing oligomer is a copolymer of a fluoroalkyl alcohol (meth)acrylic acid derivative represented by the general formula:

$$C_nF_{2n+1}(CH_2CF_2)_a(CF_2CF_2)_b(CH_2CH_2)_c\text{OCOCR}=CH_2 \quad [I]$$

wherein R is a hydrogen atom or a methyl group, n is an integer of 1 to 6, a is 1; b is an integer of 1 to 3; and c is an integer of 1 to 3; and a (meth)acrylic acid derivative represented by the general formula:

$$(CH_2=CRCO)_mR' \quad [II]$$

wherein R is a hydrogen atom or a methyl group, m is 1, 2, or 3; and when m is 1, R' is OH group, $NH_2$ group that is unsubstituted or mono- or di-substituted with an alkyl group having 1 to 6 carbon atoms, or a monovalent group derived from an alkylene glycol or polyalkylene glycol group containing an alkylene group having 2 or 3 carbon atoms; when m is 2 or 3, R' is a divalent or trivalent organic group derived from a diol or triol.

2. Nano-silica composite particles according to claim 1, wherein the alkoxysilane is a silane derivative represented by the general formula:

$$(R_1O)_pSi(OR_2)_q(R_3)_r \quad [III]$$

wherein $R_1$ and $R_3$ are each a hydrogen atom, an alkyl group having 1 to 6 carbon atoms, or an aryl group, $R_2$ is an alkyl group having 1 to 6 carbon atoms or an aryl group, proviso that not all of $R_1$, $R_2$, and $R_3$ are aryl groups; and p+q+r is 4, proviso that q is not 0.

3. Method for producing nano-silica composite particles, comprising reacting the fluorine-containing oligomer and an alkoxysilane according to claim 1 in the presence of nano-silica particles using an alkaline or acidic catalyst.

4. Method for producing nano-silica composite particles according to claim 3, wherein 10 to 100 parts by weight of fluorine-containing oligomer and 0.1 to 100 parts by weight of alkoxysilane are used based on 100 parts by weight of nano-silica particles.

* * * * *